US005755873A

United States Patent [19]
Badejo et al.

[11] Patent Number: 5,755,873
[45] Date of Patent: May 26, 1998

[54] INCORPORATION OF QUINACRIDONE ADDITIVES DURING QUINACRIDONE PREPARATION

[75] Inventors: Ibraheem T. Badejo, Charleston; John F. Britanak, Summerville; Daphne J. Rice, Charleston, all of S.C.

[73] Assignee: Bayer Corporation, Pittsburgh, Pa.

[21] Appl. No.: 748,742

[22] Filed: Nov. 18, 1996

[51] Int. Cl.$^6$ .................................................. C09B 48/00
[52] U.S. Cl. .............................. 106/497; 106/495; 546/49; 546/56
[58] Field of Search .................................. 106/497, 495; 546/49, 56

[56] References Cited

U.S. PATENT DOCUMENTS

| | | | |
|---|---|---|---|
| 3,157,659 | 11/1964 | Deuschel et al. | 546/56 |
| 3,256,285 | 6/1966 | Fuchs et al. | 546/28 |
| 3,257,405 | 6/1966 | Gerson et al. | 546/49 |
| 3,317,539 | 5/1967 | Jaffe | 546/57 |
| 3,386,843 | 6/1968 | Jaffe et al. | 106/495 |
| 4,310,359 | 1/1982 | Ehashi et al. | 106/494 |
| 4,455,173 | 6/1984 | Jaffe | 106/495 |
| 5,084,100 | 1/1992 | Bauman | 106/495 |
| 5,368,641 | 11/1994 | Dietz et al. | 106/495 |
| 5,457,203 | 10/1995 | Hendie et al. | 546/56 |
| 5,472,494 | 12/1995 | Hetzenegger et al. | 106/493 |

OTHER PUBLICATIONS

S.S. Labana and L.L. Labana, "Quinacridones" in Chemical Review, 67, 1–18 Jan. 25, 1967.
W. Herbst and K. Hunger, Industrial Organic Pigments (New York: VCH Publishers Inc. 1993) Month unavialable, pp. 448–449.

Primary Examiner—Mark L. Bell
Assistant Examiner—Scott L. Hertzog
Attorney, Agent, or Firm—Joseph C. Gil; Richard E.L. Henderson

[57] ABSTRACT

This invention relates to a process for the preparation of quinacridone pigments by (a) heating a reaction mixture comprising
  (i) a 2,5-dianilinoterephthalic acid, a 2,5-dianilino-3,6-dihydroterephthalic acid, or a 2,5-dianilino-3,6-dioxo-1,4-cyclohexadiene-1,4-dicarboxylic acid;
  (ii) about 0.1 to about 15 percent by weight, based on component (a)(i), of one or more sulfonyl-containing derivatives of 2,5-dianilinoterephthalic acid, 2,5-dianilino-3,6-dihydroterephthalic acid, and/or 2,5-dianilino-3,6-dioxo-1,4-cyclohexadiene-1,4-dicarboxylic acid; and
  (iii) about 3 to about 20 parts by weight, per part of component (a)(i), of a dehydrating agent, with the proviso that if either component (a)(i) or component (a)(ii) is a 2,5-dianilino-3,6-dihydroterephthalic acid or derivative thereof, reaction step (a) additionally comprises an oxidation step;

(b) drowning the reaction mixture from step (a) with a liquid in which the quinacridone pigment is substantially insoluble; and (c) isolating the quinacridone pigment.

13 Claims, No Drawings

INCORPORATION OF QUINACRIDONE ADDITIVES DURING QUINACRIDONE PREPARATION

BACKGROUND OF THE INVENTION

This invention relates to a process for the preparation of quinacridone pigments having reduced particle size, improved coloristic properties, improved rheological properties, and lower manufacturing costs. The inclusion of certain sulfonyl-containing derivatives of 2,5-dianilinoterephthalic acid during quinacridone synthesis provides quinacridone pigments having deeper, brighter masstones and improved transparency and rheological properties, as well as brighter, bluer metallics and bluer tints. Furthermore, because a reduction in melt viscosity allows higher loadings of raw materials during ring-closure, manufacturing costs are generally lowered.

Processes for the preparation of quinacridone are known. E.g., S. S. Labana and L. L. Labana, "Quinacridones" in *Chemical Review*, 67, 1–18 (1967), and U.S. Pat. Nos. 3,157,659, 3,256,285, and 3,317,539. The quinacridones thus obtained, known as crude quinacridones, are generally unsuitable for use as pigments and must undergo one or more additional finishing steps to modify the particle size, particle shape, or crystal structure to achieve pigmentary quality.

A preferred method for preparing quinacridones involves thermally inducing ring closure of 2,5-dianilinoterephthalic acid precursors, as well as known aniline-substituted derivatives thereof, in the presence of polyphosphoric acid. E.g., U.S. Pat. No. 3,257,405. After ring closure is complete, the melt is drowned by pouring into a liquid in which the quinacridone is substantially insoluble, usually water and/or an alcohol. The resultant crystalline pigment is then further conditioned by solvent treatment or milling in combination with solvent treatment.

Quinacridonequinones can be prepared in a similar manner except that 2,5-dianilino-3,6-dioxo-1,4-cyclohexadiene-1,4-dicarboxylic acid derivatives are used as starting materials in the ring-closure reaction. E.g., S. S. Labana and L. L. Labana, "Quinacridones" in *Chemical Review*, 67, 1–18 (1967), and W. Herbst and K. Hunger, *Industrial Organic Pigments* (New York: VCH Publishers, Inc., 1993), pages 452–453.

It is also possible to use 2,5-dianilino-3,6-dihydroterephthalic acid derivatives as starting materials in the ring-closure reaction. The resultant dihydroquinacridones must, however, be oxidized to the corresponding quinacridones before conditioning. E.g., S. S. Labana and L. L. Labana, "Quinacridones" in *Chemical Review*, 67, 1–18 (1967), and W. Herbst and K. Hunger, *Industrial Organic Pigments* (New York: VCH Publishers, Inc., 1993), pages 448–449.

Final particle size of quinacridone pigments can be controlled by the methods used in both synthesis and after-treatment. For example, quinacridone pigments can be made more transparent by reducing the particle size or more opaque by increasing the particle size. In known methods, particle size is generally controlled during precipitation of the pigment by drowning or during milling or solvent treatment of the crude pigment. Tinctorial strength and transparency of pigments can also be affected by solvent treatment. After-treatment steps that manipulate the particle size of the crude pigments are often referred to as conditioning methods.

Several suitable conditioning methods are known. However, the most commonly used methods involve milling dried crude quinacridones, generally in the presence of undesirably large amounts of an inorganic salt that must subsequently be removed. Pigmentary quinacridones can also be obtained by first premilling the dried crude material and then treating the milled material with an organic liquid. Other methods involve a premilling step followed by another milling step using water and small amounts of an organic liquid. Pigmentary quinacridones can also be obtained by heat treatment of crude presscake in large quantities of solvent. Various additives have been added during the milling, solvent treatment, or post-solvent treatment steps to further improve pigment properties. For example, U.S. Pat. No. 5,084,100 discloses a method in which crude quinacridone is ball milled in the presence of aluminum sulfate and esters of alkane dicarboxylic acids. U.S. Pat. No. 4,455,173 discloses a process in which crude quinacridone pigments are acid pasted or ball milled and then milled in an organic liquid, preferably in the presence of a 2-phthalimidomethylquinacridone particle-size growth inhibitor. Various pigment derivatives for treating pigments, including quinacridone pigments, have also been described in U.S. Pat. Nos. 3,386,843, 4,310,359, and 5,472,494.

The addition of certain quinacridone derivatives to the ring-closure step has also been reported. For example, U.S. Pat. No. 5,368,641 discloses the use of various quinacridone derivatives in the manufacture of 2,9-dimethylquinacridone, and European Patent Application 643,110 (counterpart of U.S. Pat. No. 5,457,302) describes the use of quinacridone derivatives during the oxidation of dihydroquinacridone (prepared from 2,5-dianilino-3,6-dihydroterephthalic acid) to quinacridone. See also U.S. patent applications Ser. Nos. 08/639,598 and 08/639,599.

The process of the present invention, in contrast to such known methods, does not introduce such pigment additives into the ring-closure step but instead incorporates precursors of certain sulfonyl-containing quinacridone additives during ring closure. These precursors are converted to sulfonyl-containing quinacridone additives at the same time that the quinacridone pigment itself forms. The process of the present invention provides quinacridone pigments having desirable coloristic properties, often with lower manufacturing costs.

The present invention provides smaller particle size quinacridones having improved rheological properties and transparency by the addition of certain sulfonyl-containing derivatives of 2,5-dianilinoterephthalic acid to the ring-closure step of the quinacridone synthesis. The addition of such derivatives during the ring-closure step results in a deeper, brighter pigment having improved transparency and rheological properties, as well as brighter, bluer metallics and bluer tints.

SUMMARY OF THE INVENTION

The present invention relates to a process for the preparation of quinacridone pigments comprising (a) heating, at a temperature of about 80° C. to about 145° C. (preferably 100° C. to 130° C.) (preferably for about one to about 24 hours), a reaction mixture comprising (i) 2, 5-dianilinoterephthalic acid, 2,5-dianilino-3,6-dihydroterephthalic acid, 2,5-dianilino-3,6-dioxo-1,4-cyclohexadiene-1,4-dicarboxylic acid, or a derivative thereof having one or more substituents in at least one aniline ring; a salt or ester of said acid or derivative thereof; or a mixture thereof;

(ii) about 0.1 to about 15 percent by weight (preferably 0.1 to 10 percent by weight), based on component (a)(i), of a sulfonyl-containing derivative of 2,5-dianilinoterephthalic acid having the formula (I)

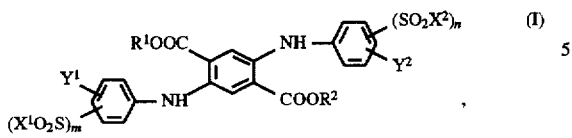

a sulfonyl-containing derivative of 2,5-dianilino-3,6-dihydroterephthalic acid having the formula (II)

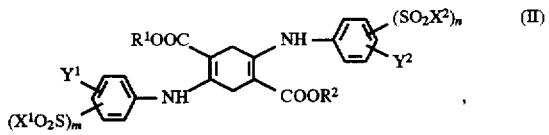

a sulfonyl-containing derivative of 2,5-dianilino-3,6-dioxo-1,4-cyclohexadiene-1,4-dicarboxylic acid having the formula (III)

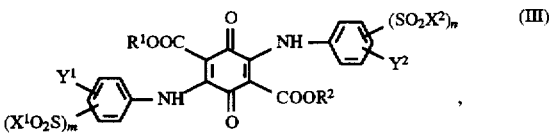

or a mixture thereof,
wherein
$X^1$ and $X^2$ are independently $OR^a$ or $NR^bR^c$,
$Y^1$ and $Y^2$ are independently hydrogen, halogen, $C_1$–$C_6$ alkyl, or $C_1$–$C_6$ alkoxy,
$R^1$ and $R^2$ are independently hydrogen, a metal, an ammonium ion, or $C_1$–$C_{12}$ alkyl,
$R^a$ is hydrogen, a metal, an ammonium ion, or $C_1$–$C_{12}$ alkyl,
$R^b$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, $C_6$–$C_{10}$ aryl, heteroaryl having five or six ring atoms (in which at least one such ring atom is N, O, S, or a combination thereof, and which are optionally fused to one or more additional aromatic rings), or $C_7$–$C_{16}$ aralkyl,
$R^c$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, or $C_7$–$C_{16}$ aralkyl, or $R^b$ and $R^c$ together with the nitrogen atom form a heterocycle having 5 to 7 ring atoms, and
m and n are independently from 0 to 3, with the proviso that at least one of m or n is not 0 (preferably where both m and n are 1); and (iii) about 3 to about 20 parts by weight (preferably 3 to 10 parts by weight), per part of component (a)(i), of a dehydrating agent (preferably polyphosphoric acid), with the proviso that if either component (a)(i) or component (a)(ii) is a 2,5-dianilino-3,6-dihydroterephthalic acid or derivative thereof, reaction step (a) additionally comprises an oxidation step (which converts the initially formed dihydroquinacridone intermediate to the corresponding quinacridone);

(b) drowning the reaction mixture from step (a) by adding said reaction mixture to about 3 to about 15 parts by weight (preferably 5 to 10 parts by weight), per part of component (a)(i), of a liquid in which the quinacridone pigment is substantially insoluble;

(c) isolating the quinacridone pigment;
(d) optionally, conditioning the quinacridone pigment; and (e) optionally, blending (preferably dry blending) the resultant quinacridone pigment with one or more pigment derivatives (preferably quinacridone derivatives).

DETAILED DESCRIPTION OF THE INVENTION

Quinacridone pigments (by which is meant unsubstituted quinacridone, quinacridone derivatives, and solid solutions thereof) are prepared according to the invention by first ring-closing 2,5-dianilino-terephthalic acid precursors, including known aniline-substituted derivatives thereof, as well as their metal or amine salts or esters, by heating the 2,5-dianilinoterephthalic acid precursors in the presence of a dehydrating agent (preferably polyphosphoric acid) and a sulfonyl-containing derivative of 2,5-dianilinoterephthalic acid according to the invention or, less preferably, by thermally inducing ring closure in a high-boiling solvent in the presence of a sulfonyl-containing derivative of 2,5-dianilinoterephthalic acid according to the invention. The quinacridone-containing reaction mixture is then drowned and the resultant quinacridone pigment is isolated by known methods. The quinacridone pigment is preferably also subjected to additional conditioning steps to improve pigmentary properties and, if desired, blended with various additives.

Ring-closure step (a) is carried out in a dehydrating agent, particularly a strong acid such as polyphosphoric acid, acidic esters of polyphosphoric acid, or sulfuric acid. E.g., U.S. Pat. No. 4,758,665; and S. S. Labana and L. L. Labana, "Quinacridones" in Chemical Reviews, 67, 1–18 (1967). Polyphosphoric acid having a phosphate content equivalent to about 110–120% $H_3PO_4$ is particularly preferred. When using polyphosphoric acid, the weight ratio of polyphosphoric acid to the total amount of terephthalic acid precursors, including the amount of sulfonyl-containing derivatives, is typically about 3:1 to about 10:1 (preferably 4:1 to 8:1). The reaction mixture of step (a) is heated at a temperature of about 80° C. to about 145° C. (preferably 100° C. to 130° C.), preferably for about 1 to about 24 hours (more preferably for 1 to 12 hours).

The process of the invention can be used to prepare unsubstituted quinacridone or ring-substituted quinacridone derivatives, depending on whether the ring closure is carried out using unsubstituted 2,5-dianilinoterephthalic acid or a derivative thereof having one or more substituents in at least one of the two aniline rings. Although essentially any 2,5-dianilinoterephthalic acid derivatives known in the art can be used, particularly preferred 2,5-dianilinoterephthalic acid derivatives are those in which both of the aniline moieties are substituted (typically with the same substituent) at the para position with groups such as halogen (preferably chlorine), $C_1$–$C_6$ alkyl (preferably methyl), and $C_1$–$C_6$ alkoxy (preferably methoxy). It is also possible to use derivatives of 2,5-dianilinoterephthalic acid in which the aniline moieties are substituted in the ortho or meta positions. The corresponding metal or amine salts (preferably alkali or alkaline earth metals salts) or esters (preferably alkyl esters) of each of the above compounds can, of course, also be used. Examples of particularly suitable 2,5-dianilinoterephthalic acid derivatives are 2,5-di(4-chloroanilino)terephthalic acid, 2,5-di(4-methylanilino)terephthalic acid, and, 2,5-di(4-methoxyanilino)terephthalic acid.

It is also possible to use mixtures containing 2,5-dianilinoterephthalic acid and one or more derivatives thereof or mixtures containing two or more 2,5- dianilinoterephthalic acid derivatives. The use of such mixtures provides a particularly advantageous method for obtaining quinacridone solid solutions. Mixtures containing 2,5-dianilinoterephthalic acid and/or a derivative thereof in combination with a fully formed quinacridone pigment (generally in crude form) can also be used.

Although less preferred, it is possible to prepare quinacridone-quinones in a similar manner except that 2,5-dianilino-3,6-dioxo-1,4-cyclohexadiene-1,4-dicarboxylic acid or a derivative thereof (including corresponding salts or esters) is used as a starting material in the ring closure reaction.

It is sometimes preferable to use a 2,5-dianilino-3,6-dihydroterephthalic acid (preferably as a $C_1$–$C_6$ alkyl ester) or a derivative thereof as a starting material in the ring-closure reaction (which may also include corresponding sulfonyl-containing derivatives), after which the resultant dihydroquinacridone must be oxidized by known methods (for example, using aromatic nitro compounds, chloroanil, anthraquinone-2-sulfonic acid or a salt thereof, anthraquinone-2,7-disulfonic acid or a salt thereof, air or other oxygen-containing gases, halogens, or electrolytic oxidation) to form the corresponding quinacridones, which are collected by known methods. E.g., S. S. Labana and L. L. Labana, "Quinacridones" in *Chemical Review*, 67, 1–18 (1967) (see pages 4–5), and W. Herbst and K. Hunger, *Industrial Organic Pigments* (New York: VCH Publishers, Inc., 1993), pages 448–449. The present invention is also directed to this variant of quinacridone synthesis. It is, of course, possible to use mixtures of 2,5-dianilino-3,6-dihydroterephthalic acids and/or derivatives thereof to obtain quinacridone solid solutions.

A critical feature of the invention is the presence of a sulfonyl-containing derivative (a)(ii) during the ring-closure reaction, although the sulfonyl-containing derivatives can be added at essentially any point during or before ring-closure step (a). Suitable sulfonyl-containing 2,5-dianilinoterephthalic acid derivatives can produce highly colored sulfonyl-containing quinacridone products. However, the utility of a sulfonyl-containing precursor is not dependent on the production of sulfonyl-containing quinacridone products that themselves exhibit good pigmentary properties.

Suitable sulfonyl-containing derivatives of 2,5-dianilinoterephthalic acid have the following formula (I)

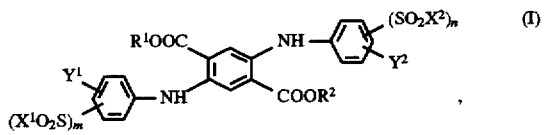

in which $X^1$ and $X^2$ can independently be OH (i.e., free sulfonic acid groups), $O^-$ cation$^+$ (i.e., salts of metals or various ammonium ions), O-alkyl (i.e., sulfonic acid alkyl esters), or $NR^bR^c$ (i.e., various sulfonamides in which each $R^b$ can independently be hydrogen or an optionally substituted alkyl, cycloalkyl, aryl, heteroaryl, or aralkyl and each $R^c$ can independently be hydrogen or an optionally substituted alkyl, cycloalkyl, or aralkyl or in which $R^b$ and $R^c$ together with the nitrogen atom can form a heterocycle having 5 to 7 ring atoms); $Y^1$ and $Y^2$ can independently be hydrogen, halogen, alkyl, or alkoxy; and m and n can be from 0 to 3 as long as at least one of m or n is not zero. In preferred embodiments, the $Y^1$ and $Y^2$ groups are identical (both preferably being hydrogen) and all $X^1$ and $X^2$ groups are identical.

As used herein, the term "$C_1$–$C_{12}$ alkyl" refers to straight or branched chain aliphatic hydrocarbon groups having from 1 to 12 carbon atoms. Examples of $C_1$–$C_{12}$ alkyl are methyl, ethyl, propyl, butyl, pentyl, hexyl, heptyl, octyl, nonyl, decyl, undecyl, dodecyl, and the isomeric forms thereof. The $C_1$–$C_{12}$ alkyl groups can also be substituted, for example, with one or more $C_1$–$C_6$ alkoxy, $C_1$–$C_6$ alkylthio, or halogen groups. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_1$–$C_6$ alkylthio" refers to analogous groups in which a sulfur atom replaces the oxygen atom. The term "$C_5$–$C_7$ cycloalkyl" refers to cycloaliphatic hydrocarbon groups having from 5 to 7 carbon atoms. Examples of $C_5$–$C_7$ cycloalkyl are cyclopentyl, cyclohexyl, and cycloheptyl. The $C_5$–$C_7$ cycloalkyl groups can also be substituted, for example, with one or more $C_1$–$C_6$ alkoxy, $C_1$–$C_6$ alkylthio, or halogen groups. The term "$C_6$–$C_{10}$ aryl" refers to phenyl and 1- or 2-naphthyl, as well as to phenyl and naphthyl groups substituted with alkyl, alkoxy, halogen, cyano, and nitro. The term "heteroaryl" refers to five- and six-membered aromatic groups in which at least one ring atom is N, O, S, or a combination thereof, and which can optionally be fused to one or more additional aromatic rings. Such heteroaryl groups are attached to the sulfonamide nitrogen atom at a ring carbon atom. Examples of heteroaryl are pyrrolyl, imidazolyl, pyrazolyl, furanyl, thiophenyl, isothiazolyl, isoxazolyl, pyridinyl, pyrazinyl, pyrimidinyl, pyridazinyl, and the like. The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "heterocycle", as used to describe compounds in which $NR^bR^c$ is a heterocycle having 5 to 7 ring atoms, includes groups in which $R^b$ and $R^b$ together are linear $C_4$–$C_6$ alkylene, alkenylene, alkadienylene, or alkatrienylene groups having one or more substituents (such as alkyl, alkoxy, or halogen) and the nitrogen atom is always tertiary rather than quaternary. Suitable heterocycles also include groups in which one or more of the ring carbon atoms is replaced with N, O, or S (the maximum number of double bonds in the ring being limited, of course, to the number giving chemically reasonable heterocyclic groups). Examples of suitable heterocycles include pyrrolidinyl, pyrrolinyl, imidazolidinyl, pyrazolidinyl, pyrazolinyl, piperidinyl, piperazinyl, morpholinyl, and the like. Examples of halogen are fluorine, chlorine, bromine, and iodine.

Although it is possible to use 2,5-dianilinoterephthalic acid derivatives containing one or more substituents other than the sulfonyl groups, including, for example, halogen (preferably chlorine), $C_1$–$C_6$ alkyl (preferably methyl), and $C_1$–$C_6$ alkoxy (preferably methoxy), the preferred 2,5-dianilinoterephthalic acid derivatives contain no substituents other than the sulfonyl groups. Particularly preferred 2,5-dianilinoterephthalic acid derivatives are "disulfonyl" compounds of formula (IV)

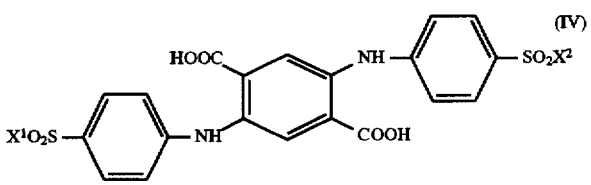

in which $X^1$ and $X^2$ are defined as above.

Among the preferred sulfonyl-containing 2,5-dianilinoterephthalic acid derivatives are sulfonic acids (or salts thereof) having the following formula (V)

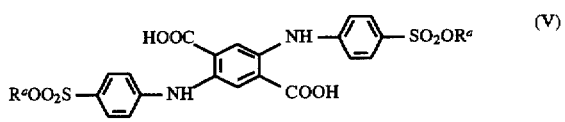

in which $R^a$ is defined as above. The preferred compounds of formula (V) are the free sulfonic acids (i.e., in which $R^a$ is hydrogen), but it is also possible to use the corresponding metal or ammonium salts. Suitable metals include alkali metals (such as lithium, sodium, and potassium), alkaline earth metals (such as magnesium, calcium, and barium), aluminum, transition metals and other heavy metals (such as nickel, iron, cobalt, manganese, copper, and tin), the polyvalent metals being used in stoichiometrically appropriate amounts (i.e., 1/k moles of a k-valent metal per mole of oxygen). Suitable ammonium cations include $NH_4^+$ and various N-alkyl, N-aryl, and/or N-aralkyl-substituted derivatives thereof. Although the strongly acidic conditions typically used for ring closure may convert such salts to the corresponding free sulfonic acids, it may nevertheless be advantageous to add the sulfonyl-containing 2,5-dianilinoterephthalic acid derivatives in salt form.

Particularly preferred sulfonyl-containing 2,5-dianilinoterephthalic acid derivatives include sulfonamides having the following formula (VI)

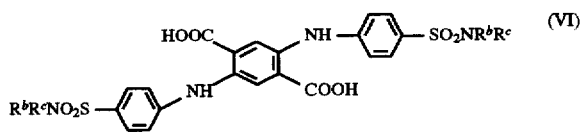

in which each $R^b$ is independently hydrogen, alkyl or substituted alkyl, cycloalkyl or substituted cycloalkyl, aryl, heteroaryl, or aralkyl and each $R^c$ is independently hydrogen, alkyl or substituted alkyl, cycloalkyl or substituted cycloalkyl, or aralkyl or, somewhat less preferably, in which $R^b$ and $R^c$ together with the nitrogen atom form a heterocycle having 5 to 7 ring atoms. Preferred compounds of formula (VI) are those in which $R^b$ and $R^c$ are both hydrogen or both alkyl or in which $R^b$ is alkyl, aryl, or heteroaryl and $R^c$ is hydrogen. Although the use of strongly acidic dehydrating agents (especially polyphosphoric acid) at elevated temperatures would be expected to convert many if not all of the sulfonamides of formula (VI) to the corresponding free sulfonic acids, it has surprisingly been found advantageous to use sulfonamides such as those of formula (VI) instead of the free acids, salts, or esters.

Analogous sulfonyl-containing derivatives of 2,5-dianilino-3,6-dihydroterephthalic formula (II) are also suitable, particularly when using 2,5-dianilino-3,6-dihydroterephthalic acids or derivatives thereof as pigment starting material (a)(i). Preferred 2,5-dianilino-3,6-dihydroterephthalic acid derivatives are "disulfonyl" compounds of formula (VII)

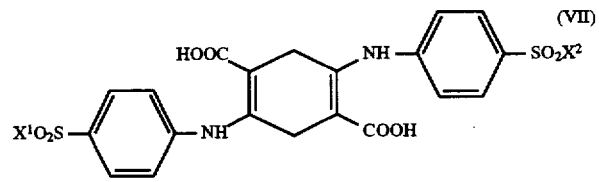

in which $X^1$ and $X^2$ are defined as above. Particularly preferred 2,5-dianilino-3,6-dihydroterephthalic acid derivatives are those having substituents corresponding to those of the terephthalic derivatives of formulas (V) and (VI). The sulfonyl-containing dihydroquinacridones that are formed during ring closure can be oxidized to the corresponding sulfonyl-containing quinacridones under the same conditions used to oxidize the dihydroquinacridone intermediates of the main pigment component.

Sulfonyl-containing derivatives of 2,5-dianilino-3,6-dioxo-1,4-cyclohexadiene-1,4-dicarboxylic acid having the formula (III) are also suitable, particularly when 2,5-dianilino-3,6-dioxo-1,4-cyclohexadiene-1,4-dicarboxylic acids or derivative thereof are used as pigment starting material (a)(i). Preferred dioxocyclohexadienedicarboxylic acid derivatives are those having substituents corresponding to those of the terephthalic derivatives of formulas (IV), (V), and (VI).

Although generally less preferred, it is possible to use any combination of pigment precursors (a)(i) with sulfonyl-containing precursors (a)(ii). For example, a quinacridone pigment can be prepared from a 2,5-dianilinoterephthalic acid in the presence of a sulfonyl-containing 2,5-dianilino-3,6-dihydroterephthalic acid, with or without oxidation of the sulfonyl-containing quinacridone component of the resultant product.

It is possible to add various fully formed quinacridone derivatives, particularly sulfonyl-containing quinacridone products prepared from the sulfonyl-containing 2,5-dianilinoterephthalic acid derivatives used in the invention, to the ring-closure step. However, it is generally more economical and less time consuming not to use such additives.

After ring-closure step (a) is completed, the quinacridone pigment is precipitated (i.e., "drowned") in step (b) by adding the strongly acidic melt to a liquid in which the quinacridone pigment is substantially insoluble, preferably water, a water-miscible solvent (such as methanol, or other lower aliphatic alcohols), or mixtures thereof. Although it is possible to add the drowning liquid to the acidic melt (e.g., U.S. Pat. No. 3,265,699), the present invention is preferably carried out by adding the acidic melt to the solvent (compare U.S. Pat. No. 4,100,162).

Suitable drowning liquids include water and/or water-miscible organic liquids; including, for example, lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred.

The temperature of the drowning liquid is usually between about 5° C. and about 65° C. In general, lower drown temperatures give pigments having smaller particle sizes. However, because process cycle time is also very important (because of manufacturing cost), a shorter drowning time is preferred. The presence of pigment derivative (a)(iii), which acts in part as a particle growth inhibitor, allows the solvent temperature to rise during the drowning process, thus shortening the time without excessive particle size growth.

The drowned pigment is then isolated in step (c) using methods known in the art, such as filtration, and then dried if desired. Other collection methods known in the art, such as centrifugation, microfiltration, or even simple decantation, are also suitable.

The crystalline pigment obtained in step (c) can be conditioned in an optional step (d) using methods known in the art, such as solvent treatment or milling in combination with solvent treatment. Final particle size of the pigment can be controlled by varying the method of aftertreatment. For example, pigments can be made more transparent by reducing the particle size or more opaque by increasing the particle size. Suitable milling methods include dry-milling methods such as sand-milling, ball-milling, and the like, with or without additives, or wet-milling methods such as salt-kneading, bead-milling, and the like in water or organic solvents, with or without additives.

Tinctorial strength and transparency of the pigment can also be affected by solvent treatment carried out by heating a dispersion of the pigment, often in the presence of additives, in a suitable solvent. Suitable solvents include organic solvents, such as alcohols, esters, ketones, and aliphatic and aromatic hydrocarbons and derivatives thereof, and inorganic solvents, such as water. Suitable additives include compositions that lessen or avoid flocculation, increase pigment dispersion stability, and reduce coating viscosity, such as polymeric dispersants (or surfactants). E.g., U.S. Pat. Nos. 4,455,173; 4,758,665; 4,844,742; 4,895,948; and, 4,895,949.

During or after the conditioning step it is often desirable to use various other optional ingredients that provide improved properties. Examples of such optional ingredients include fatty acids having at least 12 carbon atoms, such as stearic acid or behenic acid, or corresponding amides, esters, or salts, such as magnesium stearate, zinc stearate, aluminum stearate, or magnesium behenate; quaternary ammonium compounds, such as tri[($C_1$–$C_4$ alkyl)benzyl] ammonium salts; plasticizers, such as epoxidized soya bean oil; waxes, such as polyethylene wax; resin acids, such as abietic acid, rosin soap, hydrogenated or dimerized rosin; $C_{12}$–$C_{18}$-paraffin-disulfonic acids; alkylphenols; alcohols, such as stearyl alcohol; amines, such as laurylamine or stearylamine; and aliphatic 1,2-diols, such as dodecane-1,2-diol. Such additives can be incorporated in amounts ranging from about 0.05 to 20% by weight (preferably 1 to 10% by weight), based on the amount of pigment.

After the pigment has been isolated and optionally conditioned, the pigment can be blended (preferably by dry blending) with one or more pigment derivatives known in the art. Suitable pigment derivatives for step (e) include quinacridone derivatives, particularly known quinacridone sulfonic acids and sulfonamides and quinacridone derivatives containing other substituents (such as substituents containing phthalimide or heteroaromatic groups). Particularly preferred quinacridone derivatives correspond to the sulfonyl-containing quinacridone products formed by ring-closure of the sulfonyl-containing 2,5-dianilinoterephthalic acid derivatives used in the present invention.

Pigments prepared according to the invention characteristically exhibit deep (dark), bright, transparent masstones, along with bright, blue metallics, and blue tints, and sometimes exhibit improved rheological properties, all of which are highly desirable characteristics of quinacridone pigments, especially when used for automotive applications.

Because of their light stability and migration properties, the quinacridone pigments prepared according to the present invention are suitable for many different pigment applications. For example, pigments prepared according to the invention can be used as the colorant (or as one of two or more colorants) for very fast pigmented systems, such as mixtures with other materials, pigment formulations, paints, printing ink, colored paper, or colored macromolecular materials. The term "mixture with other materials" can be understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides: polymers and copolymers of acrylates, methacrylates, acrylonitrile, acrylamide, butadiene, or styrene; polyurethanes; and polycarbonates. The materials pigmented with the quinacridone pigments of the present invention can have any desired shape or form.

Pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastics materials).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Differences in hue and chroma for pigments prepared according to the Examples were measured using an Applied Color System Spectral Sensor (Hunt Associated Laboratories, Fairfax, Va.).

Solvent-based paint tests

Solvent-based paint tests were carried out using a generic alkyd melamine paint system. Pigment dispersions were prepared using a mixture of 33% AROPLAZ® 1453-X-50 alkyd resin (Reichhold Chemicals, Inc.), 63% xylene, and 4% pigment, which gave a pigment-to-binder ratio of 4:33 and a total solids content of 37%. The pigment-to-binder ratio was reduced 1:10 by addition of 2.3% AROPLAZ® 1453-X-50 alkyd resin and 6.5% RESIMENE® 717 melamine resin (Monsanto Company), which gave a total solids content of 40%. Masstone and transparency measurements were made using films applied at 152 µm and 38 µm wet film thickness, respectively, and flashed at room temperature for 30 minutes and at 121° C. for 30 minutes.

Undertone tint paints were prepared from the dispersion described above having a pigment-to-binder ratio of 4:33 by adding 31% of a dispersion prepared from 30% AROPLAZ® 1453-X-50 alkyd resin, 20% xylene, 5% NUOSPERSE® 657 (Huls America), and 50% Tl-PURE® R-960 $TiO_2$ pigment (DuPont); 21% AROPLAZ® 1453-X-50 alkyd resin; and 7% RESIMENE® 717 melamine resin, which gave a pigment-to-binder ratio of 1:2, a total solids content of 50%, and a $TiO_2$-to-pigment ratio of 90:10. Color measurements were made using films applied at 76 µm wet film thickness and flashed at room temperature for 30 minutes and at 121° C. for 30 minutes.

Metallic paints were prepared from the dispersion described above having a pigment-to-binder ratio of 4:33 using an aluminum paste (available as 5251 AR from Silberline Manufacturing Co., Inc.), AROPLAZ® 1453-X-50 alkyd resin, and RESIMENE® 717 melamine resin in quantities that provided a pigment-to-binder ratio of 1:9, an aluminum-to-pigment ratio of 20:80, and a total solids content of 41%. Color measurements were made using films applied at 76 μm wet film thickness and flashed at room temperature for 30 minutes and at 121° C. for 30 minutes.

Water-based paint tests

Water-based paint tests were carried out using a waterborne base coat/solvent-borne clear coat system. Aqueous dispersions were prepared using a mixture of 12.4% AROLON® 559-G4-70 acrylic resin (Reichhold Chemicals, Inc.), 3.2% SOLSPERSE® 27000 hyperdispersant (Zeneca, Inc.), 1.6% 2-amino-2-methyl-1-propanol (Angus Chemical), and 18% pigment, which gave a pigment-to-binder ratio of 18:12 and a total solids content of 30%. The pigment-to-binder ratio was then reduced to 10:40 with additional AROLON® 559-G4-70 acrylic resin (total amount 26%) and 25% CYMEL® 325 melamine/formaldehyde resin (Cytec Industries), which gave a total solids content of 50%. Masstone and transparency measurements were made using films applied at 76 μm and 38 μm wet film thickness, respectively, and allowed to stand at room temperature for fifteen minutes and at 100° C. for five minutes. Clear coats containing a mixture of 80% of AROPLAZ® 1453-X-50 alkyd resin and 20% CYMEL® 325 melamine/formaldehyde resin at a total solids level of 57% were then applied over the base coat at a 76 μm wet film thickness allowed to stand at room temperature for fifteen minutes and at 121° C. for fifteen minutes.

Undertone tint paints were prepared from the reduced aqueous dispersions described above having a pigment-to-binder ratio of 10:40 by adding additional AROLON® 559-G4-70 acrylic resin, CYMEL® 325 melamine/formaldehyde resin, and 35% TINT-AYD® CW-5003 white dispersion (Daniel Products Company), which gave a pigment-to-binder ratio of 1:1.1, a total solids content of 55%, and a TiO$_2$-to-pigment ratio of 90:10. Color measurements were made using films applied at 38 μm wet film thickness and allowed to stand at room temperature for fifteen minutes and at 100° C. for five minutes. Clear coats were then applied and baked as described above.

Metallic paints were prepared from the dispersion described above having a pigment-to-binder ratio of 18:12 using a water-dispersible aluminum pigment (available as HYDRO PASTE® 8726 from Silberline Manufacturing Co., Inc.), AROLON® 559-G4-70 acrylic resin, and CYMEL® 325 melamine/formaldehyde resin in quantities that provided a pigment-to-binder ratio of 1:2, an aluminum-to-pigment ratio of 20:80, and a total solids content of 43%. Color measurements were made using films applied at 38 μm wet film thickness and baked as described above. Clear coats were then applied and baked as described above.

Pigmented plastic tests

Pigment coloration of polyvinyl chloride ("PVC") was evaluated by comparing cold-milled samples prepared according to the following procedures.

A. Masstone evaluation.

For each sample tested, a 50 g portion of PVC was added to a hot (177° C.) two-roll mill having a nip thickness of 34 mils (ca. 0.8 mm) and fluxed until uniform. A 0.050 g portion of the test pigment or comparison pigment was sprinkled into the nip over a period of about ten seconds, after which the fluxed material was cut and rolled on the mill for three minutes. The pigmented sheet was removed from the mill and placed on a cold (24° C.) two-roll mill having a nip thickness of 17 mils (ca. 0.4 mm), then folded and passed through the mill twelve times. The cold-rolled sheet was again fluxed in the hot mill (nip set at 17 mils) until smooth. The resultant sheet was used for masstone evaluation.

B. Tint evaluation.

The procedure described above for masstone evaluation was repeated except that 1 g of 50% titanium dioxide paste was added to the PVC which was then fluxed until uniform prior to pigment addition. Differences in hue and chroma were then measured.

Preparation of sulfonyl-containing 2,5-dianilinoterephthalic acid derivatives

The sulfonyl-containing derivatives of 2,5-dianilinoterephthalic acid used in the Examples were prepared as follows:

2,5-Di(4-sulfamoylanilino)terephthalic acid

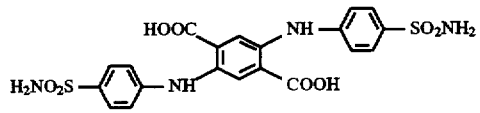

To 200 g of methanol was added with stirring 31.2 g (137 mmol) of dimethylsuccinyl succinate, 61.2 g (355 mmol) of p-sulfanilamide (Aldrich Chemical Co., Milwaukee, Wis.), and 0.7 g of concentrated sulfuric acid. The reaction mixture was heated slowly to 95° to 97° C. and maintained at that temperature for five hours. After the reaction mixture was cooled to 50° C., 34.4 g of sodium 3-nitrobenzenesulfonate, 31.8 g of water, and 1.00 g of 45% aqueous potassium hydroxide were slowly added with stirring. The resultant mixture was then slowly heated to 90° C. and maintained at that temperature for four hours. The reaction mixture was cooled to room temperature and added to 500 ml of water. Concentrated sulfuric acid was slowly added to produce a solid that was collected by filtration and washed with water. The wet presscake was dried in an oven to give 56.4 g (81.3% of theory) of 2,5-di(sulfamoylanilino)terephthalic acid. The dried product contained only one major component as determined by reverse-phase high-pressure liquid chromatography with a Waters 712 WISP system equipped with a Waters Nova C-18 cartridge using tetrahydrofuran/water as eluant.

2,5-Bis[4-(3,4-dimethyl-5-isoxazolyl)sulfamoylanilino] terephthalic acid

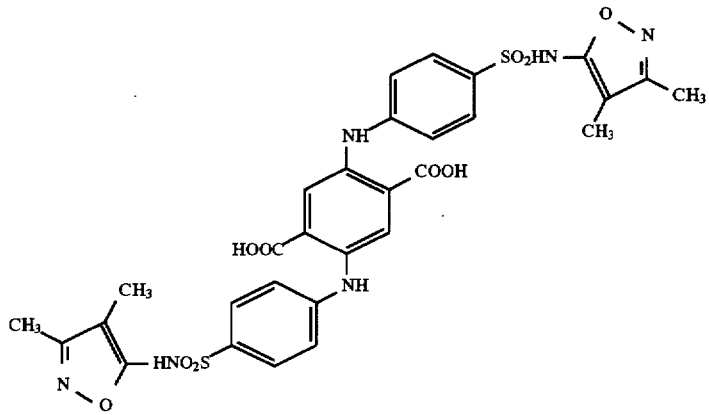

To 150 g of methanol was added with stirring 20 g (87.6 mmol) of dimethylsuccinyl succinate, 53.9 g (201.6 mmol) of 4-amino-N-(3,4-dimethyl-5-isoxazolyl) benzenesulfonamide (Aldrich Chemical Co.), and 0.7 g of concentrated sulfuric acid. The reaction mixture was heated slowly to 95° to 97° C. and maintained at that temperature for five hours. After the reaction mixture was cooled to 50° C., 26 g of sodium 3-nitrobenzenesulfonate, 2 g of water, and 75 g of 45% aqueous potassium hydroxide were slowly added with stirring. The resultant mixture was then slowly heated to 90° C and maintained at that temperature for four hours. The reaction mixture was cooled to room temperature and added to 500 ml of water. Concentrated sulfuric acid was slowly added to produce a solid that was collected by filtration and washed with water. The wet presscake was dried in an oven to give 43 g (70.4% of theory) of 2,5-bis [4-(3,4-dimethyl-5-isoxazolyl)sulfamoylanilino] terephthalic acid.

2,5-Di[4-(N,N-diethylsulfamoyl)anilino]terephthalic acid

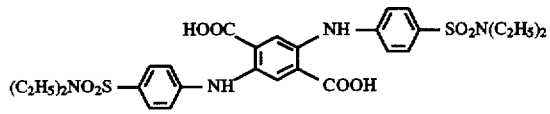

To a mixture of 56.34 g (0.77 mol) of diethylamine in 150 ml of anhydrous acetone cooled to 10° C. was added 60.0 g (0.26 mol) of acetamidobenzenesulfonyl chloride (Aldrich Chemical Co.) over a period of ten minutes. The reaction was exothermic and vigorous. After an additional 50 ml of acetone was added, the mixture was heated at reflux for two hours. The mixture, after being cooled to room temperature, was added to 1400 ml of water and stirred. The resultant solid was collected by filtration and washed with water until alkaline free. The wet presscake was added to 150 ml of water, treated with 90 g of concentrated hydrochloric acid, heated at reflux with stirring for 45 minutes, and cooled to room temperature. Concentrated ammonium hydroxide was slowly added to produce a solid that was collected by filtration and washed with water until alkaline free. The wet presscake was dried in an oven to give 51.0 g (86.6% of theory) of the intermediate compound 4-amino-(N,N-diethyl)benzenesulfonamide (or p-(N,N-diethyl) sulfanilamide).

To 150 g of methanol was added with stirring 20 g (87.6 mmol) of dimethylsuccinyl succinate, 46 g (201.6 mmol) of p-(N,N-diethyl)sulfanilamide, and 0.7 g of concentrated sulfuric acid. The reaction mixture was heated slowly to 95° to 97° C. and maintained at that temperature for five hours. After the reaction mixture was cooled to 50° C., 26 9 of sodium 3-nitrobenzenesulfonate, 2 g of water, and 75 g of 45% aqueous potassium hydroxide were slowly added with stirring. The resultant mixture was then slowly heated to 90° C. and maintained at that temperature for four hours. The reaction mixture was cooled to room temperature and added to 500 ml of water. Concentrated sulfuric acid was slowly added to produce a solid that was collected by filtration and washed with water. The wet presscake was dried in an oven to give 52.2 g (96.3% of theory) of 2,5-di[4-(N,N-diethylsulfamoyl)anilino]-terephthalic acid.

2,5-Bis[4-(3-methoxypropylsulfamoyl)anilino]-1,4-cyclohexadiene-1,4-dicarboxylic acid, dimethyl ester

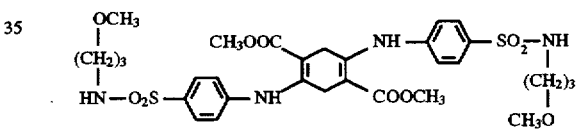

To a mixture of 40.11 g (0.45 mol) of methoxypropylamine in 113 ml of anhydrous tetrahydrofuran was added with stirring 54.9 g of sodium carbonate. The mixture was cooled to 10° C., after which was added 104.9 g (0.45 mol) of acetamidobenzenesulfonyl chloride (Aldrich Chemical Co.) over a period of 45 minutes. The mixture was held at 50° C. for two hours and cooled to room temperature. After 21 g (0.525 mol) of sodium hydroxide was added, the reaction mixture was heated at reflux for one hour. The mixture, after being cooled to room temperature, was extracted with methylene chloride. The methylene chloride solution was washed with water, dried over magnesium sulfate, filtered, and concentrated under reduced pressure to give 108 g (98%) of the intermediate compound 4-amino-N-(3-methoxypropyl)benzenesulfonamide.

To 150 g of methanol was added with stirring 20 g (87.6 mmol) of dimethylsuccinyl succinate, 50 g (204.6 mmol) of 4-amino-N-(3-methoxypropyl)benzenesulfonamide, and 1.0 g of concentrated sulfuric acid. The reaction mixture was heated slowly to 95° to 97° C. and maintained at that temperature for five hours. The reaction mixture, after being cooled to room temperature, was added to 200 ml of water and stirred. The resultant solid was collected by filtration and washed with water. The wet presscake was dried in an oven to give 30 g of 2,5-bis[4-(3-methoxy-propylsulfamoyl) anilino]-1,4-cyclohexadiene-1,4-dicarboxylic acid, dimethyl ester.

Example 1 (comparison)

Pigmentary 2,9-dimethylquinacridone was prepared in the absence of a sulfonyl-containing derivative according to the invention.

To 300 g of polyphosphoric acid (112% phosphoric acid) heated at 88° C. was added 68.2 g of 2,5-di(4-methylanilino)terephthalic acid over a period of 35 minutes, the temperature being maintained below 120° C. by adjustment of the addition rate. The reaction mixture was heated at 123° C. for two hours. The melt was cooled to 93° C. and then slowly poured into 494 g of methanol, the temperature being maintained below 64° C. by external cooling and adjustment of melt addition rate. The slurry was heated at reflux for one hour, cooled to below 60° C., diluted with water, collected by filtration, and washed with water until acid free. The resultant presscake was reslurried in water. After adjustment of the pH to greater than 7, 5.5 g of 50% sodium hydroxide was added and the resultant slurry was heated at 90° C. for one hour. The slurry was cooled, filtered, and washed with water until alkaline free, then reslurried in water. After adjustment of the pH to 9.5, the slurry was heated at 143° C. for two hours in a closed system (e.g., a pressure reactor), and cooled to 40° C. After the slurry was acidified to pH 3.3, an emulsion of 2.2 g of an anionic surfactant, 30 g of a petroleum distillate, and 80 g of water was added, and the slurry was stirred for three hours. The wet cake can be dried or used as is for specific applications. Here, the wet cake was dried in an oven at 60° C. to give approximately 60 g of 2,9-dimethylquinacridone as a magenta pigment.

Example 2 (comparison)

Pigmentary quinacridone was prepared in the absence of a sulfonyl-containing derivative according to the invention.

To 270 g of polyphosphoric acid (117% phosphoric acid) heated at 80° C. was added 60 g of 2,5-dianilinoterephthalic acid. The reaction mixture was heated at 123° C. for four hours. After the melt was cooled to 94° C., the acid strength was adjusted to 110% by the dropwise addition of phosphoric acid. The melt was stirred for 20 minutes and then slowly poured into 400 g of methanol, the temperature being maintained below 60° C. by external cooling and adjustment of melt addition rate. The slurry was heated at reflux for one hour and diluted with water, after which the solid component was collected by filtration and washed with water until acid free. The resultant presscake was reslurried in water. After adjustment of the pH to about 7, 6 g of 50% sodium hydroxide was added and the resultant slurry was heated at 90° C. for two hours. The slurry was cooled, filtered, and washed with water until alkaline free, then reslurried in water. After adjustment of the pH to 9.3, 3.2 g of a cycloaliphatic carboxylic acid was added. The resultant slurry was heated at 142° C. for two hours in a closed system, cooled, acidified with phosphoric acid, and stirred. The solid component was collected by filtration and washed with water. The wet cake can be dried or used as is for specific applications. Here, the wet cake was dried in an oven at 60° C. to give approximately 48.4 g of quinacridone as a violet pigment.

Example 3

Pigmentary 2,9-dimethylquinacridone was prepared exactly as described in comparison Example 1 except that 2% by weight, relative to the 2,5-di(4-methylanilino)terephthalic acid, of 2,5-di(sulfamoylanilino)terephthalic acid (1.4 g) was included in the ring-closure reaction. 2,9-Dimethylquinacridone (58 g) was obtained as a magenta pigment.

A water-based paint prepared as described above exhibited a deeper, brighter, more transparent masstone and increased metallic brightness with improved rheological properties compared to QUINDO® Magenta RV-6832 (available from Bayer Corporation).

An alkyd melamine enamel paint prepared as described above exhibited a deeper, brighter, more transparent masstone with improved rheological properties compared to a paint prepared using QUINDO® Magenta RV-6832.

Example 4

Pigmentary 2,9-dimethylquinacridone was prepared exactly as described in comparison Example 1 except that 5% by weight, relative to the 2,5-di(4-methylanilino)terephthalic acid, of 2,5-di(sulfamoylanilino)terephthalic acid (3.4 g) was included in the ring-closure reaction. 2,9-Dimethylquinacridone (59 g) was obtained as a magenta pigment.

A water-based paint prepared as described above exhibited a deeper, brighter, more transparent masstone and increased metallic brightness with improved Theological properties compared to QUINDO® Magenta RV-6832.

An alkyd melamine enamel paint prepared as described above exhibited a deeper, brighter, more transparent masstone and increased metallic brightness with improved rheological properties compared to a paint prepared using QUINDO® Magenta RV-6832.

Example 5

Pigmentary 2,9-dimethylquinacridone was prepared exactly as described in comparison Example 1 except that 10% by weight, relative to the 2,5-di(4-methylanilino)terephthalic acid, of 2,5-di(sulfamoylanilino)terephthalic acid (6.8 g) was included in the ring-closure reaction. 2,9-Dimethylquinacridone (59 g) was obtained as a magenta pigment.

A water-based paint prepared as described above exhibited a deeper, brighter, more transparent masstone and increased metallic brightness with improved rheological properties compared to QUINDO® Magenta RV-6832.

An alkyd melamine enamel paint prepared as described above exhibited a deeper, brighter, more transparent masstone and increased metallic brightness with improved rheological properties compared to a paint prepared using QUINDO® Magenta RV-6832.

Example 6

Pigmentary quinacridone was prepared exactly as described in comparison Example 2 except that 10% by weight, relative to the 2,5-dianilinoterephthalic acid, of 2,5-di(sulfamoylanilino)terephthalic acid (6 g) was included in the ring-closure reaction. Quinacridone (50.2 g) was obtained as a violet pigment.

A water-based paint prepared as described above exhibited a slightly deeper, more transparent masstone and increased metallic brightness compared to a paint prepared using the pigment of comparison Example 2.

Example 7

Pigmentary 2,9-dimethylquinacridone was prepared exactly as described in comparison Example 1 except that 10% by weight, relative to the 2,5-di(4-methylanilino)terephthalic acid, of 2,5-bis[4-(3,4-dimethyl-5-isoxazolyl)sulfamoylanilino]terephthalic acid (6.8 g) was included in the ring-closure reaction. 2,9-Dimethylquinacridone (59 g) was obtained as a magenta pigment.

A water-based paint prepared as described above exhibited a deeper, brighter, more transparent masstone, blue tint and metallic, and increased metallic brightness compared a paint prepared using the pigment of comparison Example 1.

Example 8

Pigmentary 2,9-dimethylquinacridone was prepared exactly as described in comparison Example 1 except that 10% by weight, relative to the 2,5-di(4-methylanilino) terephthalic acid, of 2,5-di[4-(N,N-diethylsulfamoyl) anilino]terephthalic acid (6.8 g) was included in the ring-closure reaction. 2,9-Dimethylquinacridone (59 g) was obtained as a magenta pigment.

A water-based paint prepared as described above exhibited a deeper, brighter, more transparent masstone, blue tint and metallic, and increased metallic brightness compared a paint prepared using the pigment of comparison Example 1.

Example 9

Pigmentary 2,9-dimethylquinacridone was prepared exactly as described in comparison Example 1 except that 10% by weight, relative to the 2,5-di(4-methylanilino) terephthalic acid, of 2,5-bis[4-(3-methoxypropylsulfamoyl) anilino]-1,4-cyclohexadiene-1,4-dicarboxylic acid, dimethyl ester (6.8 g) was included in the ring-closure reaction. 2,9-Dimethylquinacridone (60.3 g) was obtained as a magenta pigment.

Example 10 (comparison)

Gamma quinacridone was prepared from 2,5-dianilino-3,6-dihydroterephthalic acid in the absence of a sulfonyl-containing derivative.

To 320 g of polyphosphoric acid (116.5% phosphoric acid) was added 64 g of 2,5-dianilino-3,6-dihydroterephthalic acid over a period of 45 minutes, the temperature being maintained below 1 10C. The reaction mixture was stirred at 100° to 110° C. for one hour and then allowed to cool to 85° C., after which the phosphoric acid concentration was reduced to 85% by the slow addition of chilled water. The mixture was stirred at 85° to 90° C. for 30 minutes, then slowly poured into 1200 ml of ice/water and stirred at less than 30° C. for an additional hour. The solid component was collected by filtration and washed with water. The resultant wet presscake was reslurried in 181.3 g of methanol and 73.9 g of water and stirred until uniform. After 37.3 g of 50% aqueous sodium hydroxide was added, the slurry was stirred at less than 35° C. for one hour. The slurry was then heated to 60° C., diluted with 116.6 g of water, and heated at reflux for 30 minutes. After the slurry was allowed to cool to 60° C., 37.3 g of 92% sodium 3-nitrobenzenesulfonate and 31.6 g of water were added sequentially. After ten minutes, the slurry was heated at 88° C. for three hours. Upon being cooled to room temperature, the solid component was isolated by filtration and washed with water. The wet presscake cake was dried to give 42.5 g of gamma quinacridone.

Example 11

Gamma quinacridone was prepared from 2,5-dianilino-3,6-dihydroterephthalic acid in the presence of a sulfonyl-containing 2,5-dianilino-3,6-dihydroterephthalic acid derivative according to the invention.

To 320 g of polyphosphoric acid (116.5% phosphoric acid) was sequentially added 6.8 g of 2,5-bis[4-(3-methoxypropylsulfamoyl)anilino]-1,4-cyclohexadiene-1,4-dicarboxylic acid, dimethyl ester and 64 g of 2,5-dianilino-3,6-dihydroterephthalic acid over a period of 45 minutes, the temperature being maintained below 110° C. The reaction mixture was stirred at 100° to 110° C. for one hour and then allowed to cool to 85° C., after which the phosphoric acid concentration was reduced to 85% by the slow addition of chilled water. The mixture was stirred at 85° to 90° C. for 30 minutes, then slowly poured into 1200 ml of ice/water and stirred at less than 30° C. for an additional hour. The solid component was collected by filtration and washed with water. The resultant wet presscake was reslurried in 181.3 g of methanol and 73.9 g of water and stirred until uniform. After 37.3 g of 50% aqueous sodium hydroxide was added, the slurry was stirred at less than 35° C. for one hour. The slurry was then heated to 60° C., diluted with 12.6 g of water, and heated at reflux for 30 minutes. After the slurry was allowed to cool to 60° C., 37.3 g of 92% sodium 3-nitrobenzenesulfonate and 31.6 g of water were added sequentially. After ten minutes, the slurry was heated at 88° C. for 15 hours. Upon being cooled to room temperature, the solid component was isolated by filtration and washed with water. The wet presscake cake was reslurried in 357.1 g of methanol and 357.1 g of water (which includes the amount of water in the presscake). When the slurry became uniform, 95.2 g of 50% aqueous sodium hydroxide and an additional 60.0 g of 92% sodium 3-nitrobenzenesulfonate were added. The resultant slurry was heated in a sealed system at 115° to 120° C. for six hours. Upon being cooled to room temperature, the solid component was isolated by filtration and washed with water. The wet presscake cake was dried to give 41.0 g of gamma quinacridone.

A pigmented PVC sample prepared as described above using the pigment of Example 11 of the invention exhibited more transparent masstone and yellower tint than a pigmented PVC sample prepared using the pigment of comparison Example 10.

What is claimed is:

1. A process for the preparation of quinacridone pigments comprising (a) heating, at a temperature of about 80° C. to about 145° C., a reaction mixture comprising (i) 2,5-dianilinoterephthalic acid, 2,5-dianilino-3,6-dihydroterephthalic acid, 2,5-dianilino-3,6-dioxo-1,4-cyclohexadiene-1,4-dicarboxylic acid, or a derivative thereof having one or more substituents in at least one aniline ring; a salt or ester of said acid or derivative thereof; or a mixture thereof;

(ii) about 0.1 to about 15 percent by weight, based on component (a)(i), of a sulfonyl-containing derivative of 2,5-dianilinoterephthalic acid having the formula

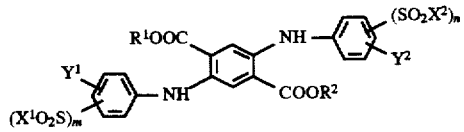

a sulfonyl-containing derivative of 2,5-dianilino-3,6-dihydroterephthalic acid having the formula

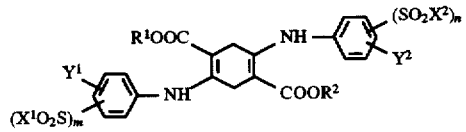

and/or a sulfonyl-containing derivative of 2,5-dianilino-3,6-dioxo-1,4-cyclohexadiene-1,4-dicarboxylic acid having the formula

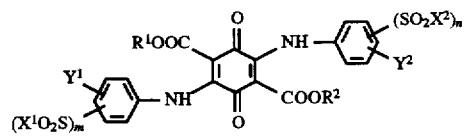

or a mixture thereof,
wherein
$X^1$ and $X^2$ are independently $OR^a$ or $NR^bR^c$,
$Y^1$ and $Y^2$ are independently hydrogen, halogen, $C_1$–$C_6$ alkyl, or $C_1$–$C_6$ alkoxy, $R^1$ and $R^2$ are independently hydrogen, a metal, an ammonium ion, or $C_1$–$C_{12}$ alkyl, $R^a$ is hydrogen, a metal, an ammonium ion, or $C_1$–$C_{12}$ alkyl, $R^b$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, $C_6$–$C_{10}$ aryl, heteroaryl having five or six ring atoms in which at least one such ring atom is N, O, S, or a combination thereof, or $C_7$–$C_{16}$ aralkyl, $R^c$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, or $C_7$–$C_{16}$ aralkyl, or $R^b$ and $R^c$ together with the nitrogen atom form a heterocycle having 5 to 7 ring atoms, and m and n are independently from 0 to 3, with the proviso that at least one of m or n is not 0; and (iii) about 3 to about 20 parts by weight, per part of component (a)(i), of a dehydrating agent, with the proviso that if either component (a)(i) or component (a)(ii) is a 2,5-dianilino-3,6-dihydroterephthalic acid or derivative thereof, reaction step (a) additionally comprises an oxidation step;

(b) drowning the reaction mixture from step (a) by adding said reaction mixture to about 3 to about 15 parts by weight, per part of component (a)(i), of a liquid in which the quinacridone pigment is substantially insoluble;

(c) isolating the quinacridone pigment;

(d) optionally, conditioning the quinacridone pigment; and (e) optionally, blending the resultant quinacridone pigment with one or more pigment derivatives.

2. A process according to claim 1 wherein component (a)(i) is selected from the group consisting of 2,5-dianilinoterephthalic acid, 2,5-di(4-methylanilino)terephthalic acid, 2,5-di(4-methoxyanilino)terephthalic acid, 2,5-di(4-chloroanilino)terephthalic acid, and mixtures thereof.

3. A process according to claim 1 wherein component (a)(ii) is a sulfonyl-containing derivative of 2,5-dianilinoterephthalic acid having the formula

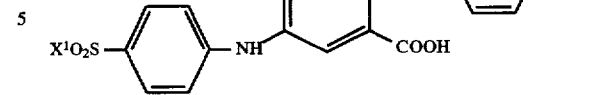

wherein $X^1$ and $X^2$ are independently $OR^a$ (wherein $R^a$ is hydrogen, a metal, an ammonium ion, or $C_1$–$C_{12}$ alkyl) or $NR^bR^c$ (wherein $R^b$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, $C_6$–$C_{10}$ aryl, heteroaryl having five or six ring atoms in which at least one such ring atom is N, O, S, or a combination thereof, or $C_7$–$C_{16}$ aralkyl, and $R^c$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, or $C_7$–$C_{16}$ aralkyl, or wherein $R^b$ and $R^c$ together with the nitrogen atom form a heterocycle having 5 to 7 ring atoms).

4. A process according to claim 1 wherein component (a)(ii) is a sulfonyl-containing derivative of 2,5-dianilinoterephthalic acid having the formula

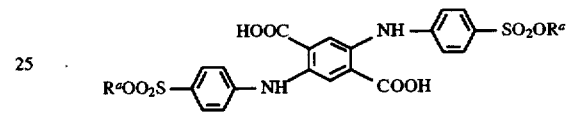

wherein $R^a$ is hydrogen, a metal, an ammonium ion, or $C_1$–$C_{12}$ alkyl.

5. A process according to claim 1 wherein component (a)(ii) is a sulfonyl-containing derivative of 2,5-dianilinoterephthalic acid having the formula

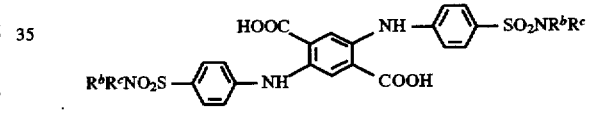

wherein each $R^b$ is independently hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, $C_6$–$C_{10}$ aryl, heteroaryl having five or six ring atoms in which at least one such ring atom is N, O, S, or a combination thereof, or $C_7$–$C_{16}$ aralkyl, and each $R^c$ is independently hydrogen, $C_1$–$C_{12}$ alkyl, $C_5$–$C_7$ cycloalkyl, or $C_7$–$C_{16}$ aralkyl, or wherein $R^b$ and $R^c$ together with the nitrogen atom form a heterocycle having 5 to 7 ring atoms.

6. A process according to claim 1 wherein component (a)(ii) is

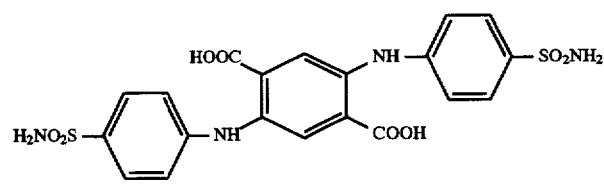

,

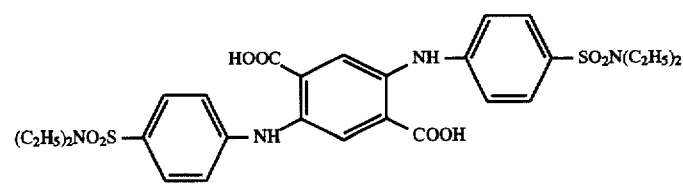

, or

-continued

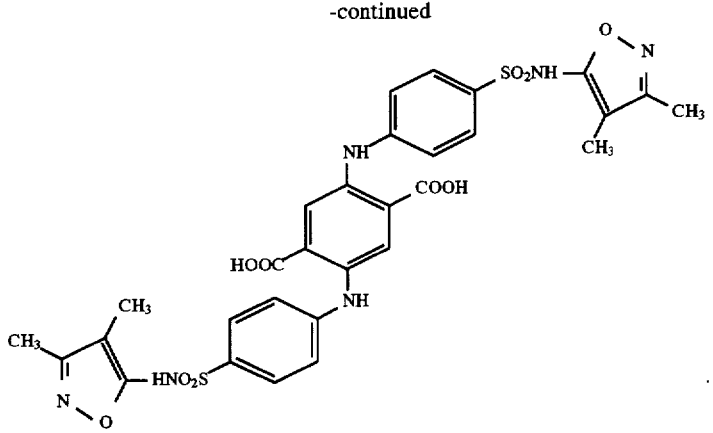

7. A process according to claim 1 wherein component (a)(ii) is a sulfonyl-containing derivative of 2,5-dianilino3,6-dihydroterephthalic acid having the formula

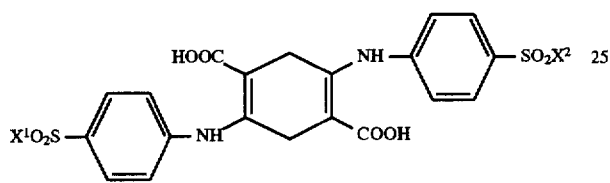

wherein $X^1$ and $X^2$ are independently $OR^a$ (wherein $R^a$ is hydrogen, a metal, an ammonium ion, or $C_1$–$C_{12}$ alkyl) or $NR^bR^c$ (wherein $R^b$ is hydrogen, C1–C12 alkyl or substituted $C_1$–$C_{12}$ alkyl, $C_5$–$C_7$ cycloalkyl or substituted $C_5$–$C_7$ cycloalkyl, $C_6$–$C_{10}$ aryl, heteroaryl having five or six ring atoms in which at least one such ring atom is N, O, S, or a combination thereof, or $C_7$–$C_{16}$ aralkyl, and $R^c$ is hydrogen, $C_1$–$C_{12}$ alkyl or substituted $C_1$–$C_{12}$ alkyl, $C_5$–$C_7$ cycloalkyl or substituted $C_5$–$C_7$ cycloalkyl, or $C_7$–$C_{16}$ aralkyl, or wherein $R^b$ and $R^c$ together with the nitrogen atom form a heterocycle having 5 to 7 ring atoms).

8. A process according to claim 1 wherein component (a)(ii) is

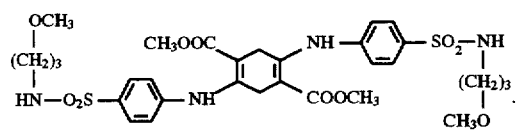

9. A process according to claim 1 wherein the reaction mixture is heated in step (a) at a temperature of 100° C. to 130° C.

10. A process according to claim 1 wherein the dehydrating agent (a)(iii) is polyphosphoric acid.

11. A process according to claim 10 wherein 3 to 10 parts by weight, relative to component (a)(i), of polyphosphoric acid is used.

12. A process according to claim 1 wherein the reaction mixture from step (a) is drowned by adding said reaction mixture to water, a lower aliphatic alcohol, or a mixture thereof.

13. A process according to claim 1 wherein the reaction mixture from step (a) is drowned by adding said reaction mixture to methanol.

* * * * *